(12) United States Patent  
Yokose (10) Patent No.: US 7,308,150 B2  
(45) Date of Patent: Dec. 11, 2007

(54) IMAGE PROCESSING APPARATUS

(75) Inventor: Taro Yokose, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1118 days.

(21) Appl. No.: 10/370,561

(22) Filed: Feb. 24, 2003

(65) Prior Publication Data

US 2004/0057083 A1  Mar. 25, 2004

(30) Foreign Application Priority Data

Sep. 19, 2002 (JP) .............................. 2002-273721

(51) Int. Cl.
 G06K 9/36 (2006.01)
 H04N 1/413 (2006.01)
 H03M 7/46 (2006.01)
(52) U.S. Cl. ..................... 382/245; 382/238; 382/239; 358/426.13; 341/63
(58) Field of Classification Search ................ 382/245, 382/238, 239; 358/426.13; 341/63
 See application file for complete search history.

(56) References Cited

U.S. PATENT DOCUMENTS

| 4,633,325 | A | * | 12/1986 | Usubuchi | 382/238 |
| 4,888,645 | A | * | 12/1989 | Mitchell et al. | 382/235 |
| 5,635,932 | A | | 6/1997 | Shinagawa et al. | |
| 5,748,122 | A | | 5/1998 | Shinagawa et al. | |
| 6,268,809 | B1 | * | 7/2001 | Saito | 341/51 |
| 6,775,413 | B1 | * | 8/2004 | Acharya | 382/245 |
| 6,832,005 | B2 | * | 12/2004 | Malvar | 382/238 |

FOREIGN PATENT DOCUMENTS

| JP | A-64-047169 | 2/1989 |
| JP | A-08-111781 | 4/1996 |
| JP | A-08-116269 | 5/1996 |
| JP | A-11-027679 | 1/1999 |
| JP | A 11-168389 | 6/1999 |
| JP | A 2000-350215 | 12/2000 |

* cited by examiner

Primary Examiner—Alexander Eisen  
Assistant Examiner—Clifton G Daley  
(74) Attorney, Agent, or Firm—Oliff & Berridge, PLC (57) ABSTRACT

To provide an image coding apparatus that can generate a code that can be decoded by a general decoding apparatus while attaining a high coding speed. As a result of processing in a plurality of prediction units 21, a control unit 11 generates a predicted pixel value for a pixel of interest based on a pixel value of a predicting pixel located at a distance from the pixel of interest, the distance being predetermined for each pixel value prediction unit 21, counts, as a run-length for each pixel value prediction unit 21, the number of times that the pixel value of the pixel of interest successively correspond with the predicted pixel value, selects any of pixel value prediction units related to a run-length of one pixel or more, and outputs a code by referring to a predetermined code table with respect to a distance between the pixel of interest and the predicting pixel for the selected pixel value prediction unit 21 and the run-length thereof. The code table is defined to include, as a redundant code, a code related to a distance other than the distances between the pixel of interest and the predicting pixels.

10 Claims, 4 Drawing Sheets

IMAGE PROCESSING APPARATUS

BACKGROUND OF THE INVENTION

1. Field of the Invention

The present invention relates to an image coding apparatus for coding image data.

2. Description of the Related Art

Figure 3:
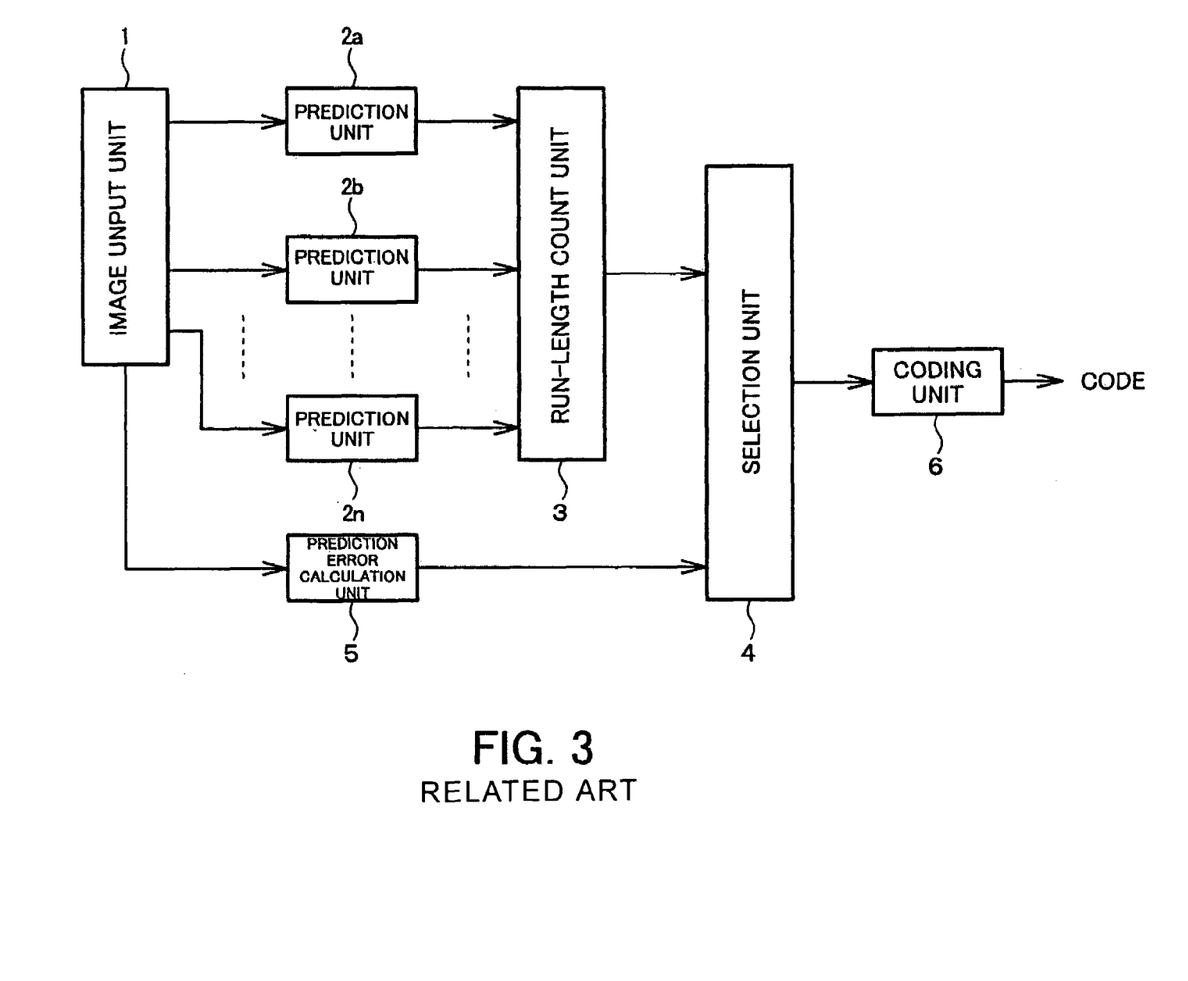
FIG. 3 is a block diagram for illustrating a function of a conventional image processing program.

In an image processing apparatus, such as a copier, image data to be processed is coded and compressed for efficient transfer of the image data. For higher processing speed of the whole image processing apparatus, a higher compression speed is desired. Thus, in view of balancing compression ratio and processing speed, an image coding apparatus shown in FIG. 3 is utilized, for example. The image coding apparatus is equivalent to that described in Japanese Patent Laid-Open Publication No. 2000-350215.

Figure 4:
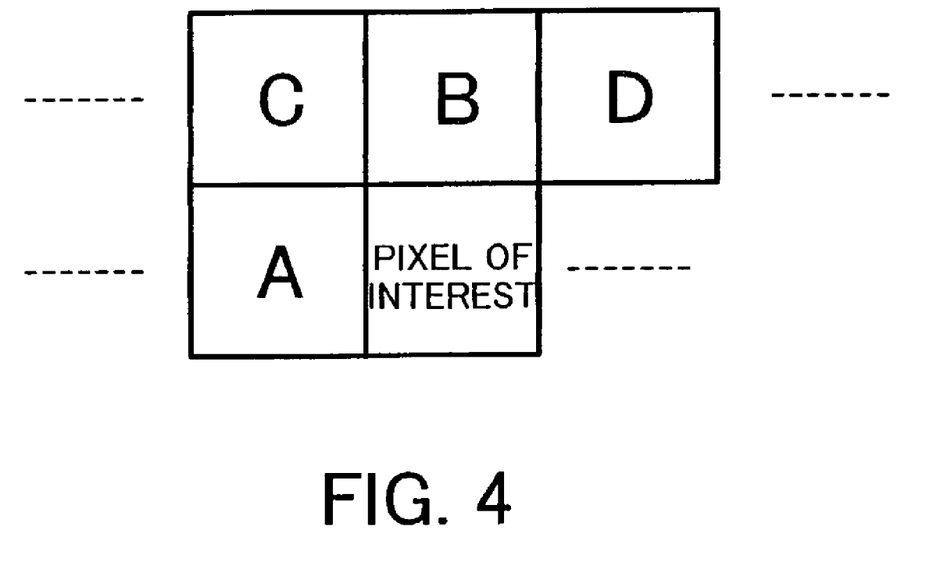
FIG. 4 illustrates a positional relationship between a pixel of interest and a predicting pixel.

In the image coding apparatus shown in FIG. 3, pixels of interest are sequentially selected from image data input via an image input unit 1 in a predetermined scanning order, and a pixel value of each pixel of interest is predicted by a plurality of prediction units 2a, 2b, . . . , 2n. As shown in FIG. 4, each prediction unit 2 outputs, as a predicted pixel value, values of pixels in the vicinity of the pixel of interest, for example, values of a pixel (A) located to the left of the pixel of interest, a pixel (B) located above the pixel of interest, a pixel (C) locate to the left of the pixel (B) and a pixel (D) located to the right of the pixel (B). For each prediction unit 2, a run-length count unit 3 counts the number of times the prediction unit 2 successively outputs the predicted pixel value corresponding with the pixel value of the pixel of interest.

A selection unit 4 selects a longest run-length from the run-lengths counted by the run count unit 3. If the longest run-length is equal to 1 or greater, the selection unit 4 outputs information for identifying the prediction unit 2 having output the longest run-length (identification information). On the other hand, if the longest run-length is 0, the selection unit 4 outputs a prediction error (a difference between pixel values of the pixel A and pixel of interest in FIG. 4, for example) generated by a prediction error calculation unit 5. A coding unit 6 codes the identification information on the prediction unit 2 or the prediction error output from the selection unit 4 based on a code table and outputs the result.

Another conventional image coding apparatus is based on the periodicity of image data. To provide an LZ77-based data compression apparatus, the apparatus comprises a moving window for storing coded input data and a comparator for comparing a substring of an entry in the moving window with a data string obtained by coding the substring. The number of comparators is less than the size of the moving window, and a vicinity of 0, a vicinity of L (L being an input parameter) or a vicinity of 2L is used as an offset to the entry. (Japanese Patent Laid-Open Publication No. Hei11-168389)

SUMMARY OF THE INVENTION

As alluded to above, there are many types of image data coding methods, such that when decoding coded image data a decoder suitable for the adopted coding method must be provided. However, because codes resulting from the inventions described in the above-noted patent references are unique, thy cannot be decoded by common decoding apparatuses.

The present invention was devised in view of this problem with the related art. One of the advantages realized by the present invention is the provision of an image coding apparatus that essentially has the same configuration as that described in patent reference 1 and which can generate a code that can be decoded by a general decoding apparatus while attaining a high coding speed.

In addition, another advantage of the invention is to provide an image coding apparatus that generates a conventional code for processing in the apparatus and generates a code that can be decoded by a general decoding apparatus if it is to be output by the apparatus.

The present invention provides an image coding apparatus comprising a plurality of pixel value predicting means for sequentially selecting pixels in image data to be processed as pixels of interest in a predetermined scanning order and generating predicted pixel values of the pixels of interest, each pixel value predicting means generating a predicted pixel value based on a pixel value of a predicting pixel located at a distance from the pixel of interest predetermined for each pixel value predicting means; run-length count means for counting, as a run-length for each pixel value predicting means, the number of times that the pixel values of the sequentially selected pixels of interest successively correspond with the predicted pixel values generated by each pixel value predicting means based on a relationship between the pixels of interest and the predicting pixels; selecting means for selecting any of pixel value predicting means related to a run-length of one pixel or more; and coding means for referring to a predetermined code table with respect to a distance between the pixel of interest and the predicting pixel determined for the selected pixel value predicting means and the run-length related to said selected pixel value predicting means and outputting a resulting code, wherein said code table is defined to include, as a redundant code, a code related to a distance other than the distances between the pixel of interest and the predicting pixels.

Preferably, at least one of a minimum value and a maximum value of the run-length is set in said run-length count means, and the value of the run-length to be counted is defined based on the setting. Preferably, said selecting means compares the run-lengths for the pixel value predicting means and selects pixel value predicting means that is related to the longest run-length. Furthermore, it is preferable that said selecting means preliminarily selects a plurality of pixel value predicting means from among the pixel value predicting means related to a run-length of one pixel or more, adopts, as a code to be investigated, each of codes obtained based on the distances between the pixel of interest and the predicting pixel determined for each of the preliminarily selected pixel value predicting means and the run-length for each of the preliminarily selected pixel value predicting means, and selects one of said preliminarily selected pixel value predicting means based on a predetermined condition involving a code length of each code to be investigated and the run-length for each pixel value predicting means.

Preferably, said preliminarily selected pixel value predicting means include a pixel value predicting means related to the longest run-length, and when there is a code to be investigated having a code length shorter than that of a code obtained based on the distance between the pixel of interest and the predicting pixel determined for the pixel value predicting means related to the longest run-length and the run-length, the pixel value predicting means related to the shorter code is selected, or the pixel value predicting means related to the longest run-length is selected.

Preferably, the image coding apparatus further comprises second coding means for outputting a code based on information for identifying the selected pixel value predicting means and the run-length counted for the selected pixel value predicting means.

According to one aspect of the invention, there is provided an image coding apparatus that outputs, for image data including one or more identical same-pixel-value strings, a code determined based on a positional relationship between the same-pixel-value strings and a length of the same-pixel-value strings, comprising means for retrieving a same-pixel-value string with respect to only one partial positional relationship selected from among all of possible positional relationships detected in a predetermined range of the image data; and means for coding the retrieved same-pixel-value string by referring to a code table including codes related to all the possible positional relationships detected in said predetermined range of said image data.

According to another aspect of the invention, there is provided an image coding method which uses a plurality of pixel value predicting devices for sequentially selecting pixels in image data to be processed as pixels of interest in a predetermined scanning order and generating predicted pixel values of the pixels of interest, each pixel value predicting device generating a predicted pixel value based on a pixel value of a predicting pixel located at a distance from the pixel of interest predetermined for each pixel value predicting device, the method comprising a step of counting, as a run-length for each pixel value predicting device, the number of times that the pixel values of the sequentially selected pixels of interest successively correspond with the predicted pixel values generated by each pixel value predicting device based on a relationship between the pixels of interest and the predicting pixels; a step of selecting any of pixel value predicting devices related to a run-length of one pixel or more; and a step of referring to a predetermined code table with respect to a distance between the pixel of interest and the predicting pixel determined for the selected pixel value predicting device and the run-length related to said selected pixel value predicting device and outputting a resulting code, wherein said code table is defined to include, as a redundant part, a code related to a distance other than the distances between the pixel of interest and the predicting pixels. Preferably, the method further comprises a second coding step of outputting a code based on information for identifying the selected pixel value predicting device and the run-length counted for the selected pixel value predicting device.

Furthermore, according to another aspect of the invention, there is provided an image coding program that causes a computer to perform a procedure of processing a plurality of pixel value predicting modules for sequentially selecting pixels in image data to be processed as pixels of interest in a predetermined scanning order and generating predicted pixel values of the pixels of interest, each pixel value predicting module generating a predicted pixel value based on a pixel value of a predicting pixel located at a distance from the pixel of interest predetermined for each pixel value predicting module; a procedure of counting, as a run-length for each pixel value predicting module, the number of times that the pixel values of the sequentially selected pixels of interest successively correspond with the predicted pixel values generated by each pixel value predicting module based on a relationship between the pixels of interest and the predicting pixels; a procedure of selecting any of pixel value predicting modules related to a run-length of one pixel or more; and a procedure of referring to a predetermined code table with respect to a distance between the pixel of interest and the predicting pixel determined for the selected pixel value predicting module and the run-length related to said selected pixel value predicting module and outputting a resulting code, wherein said code table is defined to include, as a redundant part, a code related to a distance other than the distances between the pixel of interest and the predicting pixels. Preferably, the program causes the computer to further perform: a second coding procedure of outputting a code based on information for identifying the selected pixel value predicting module and the run-length counted for the selected pixel value predicting module.

DESCRIPTION OF THE PREFERRED EMBODIMENT

Figure 1:
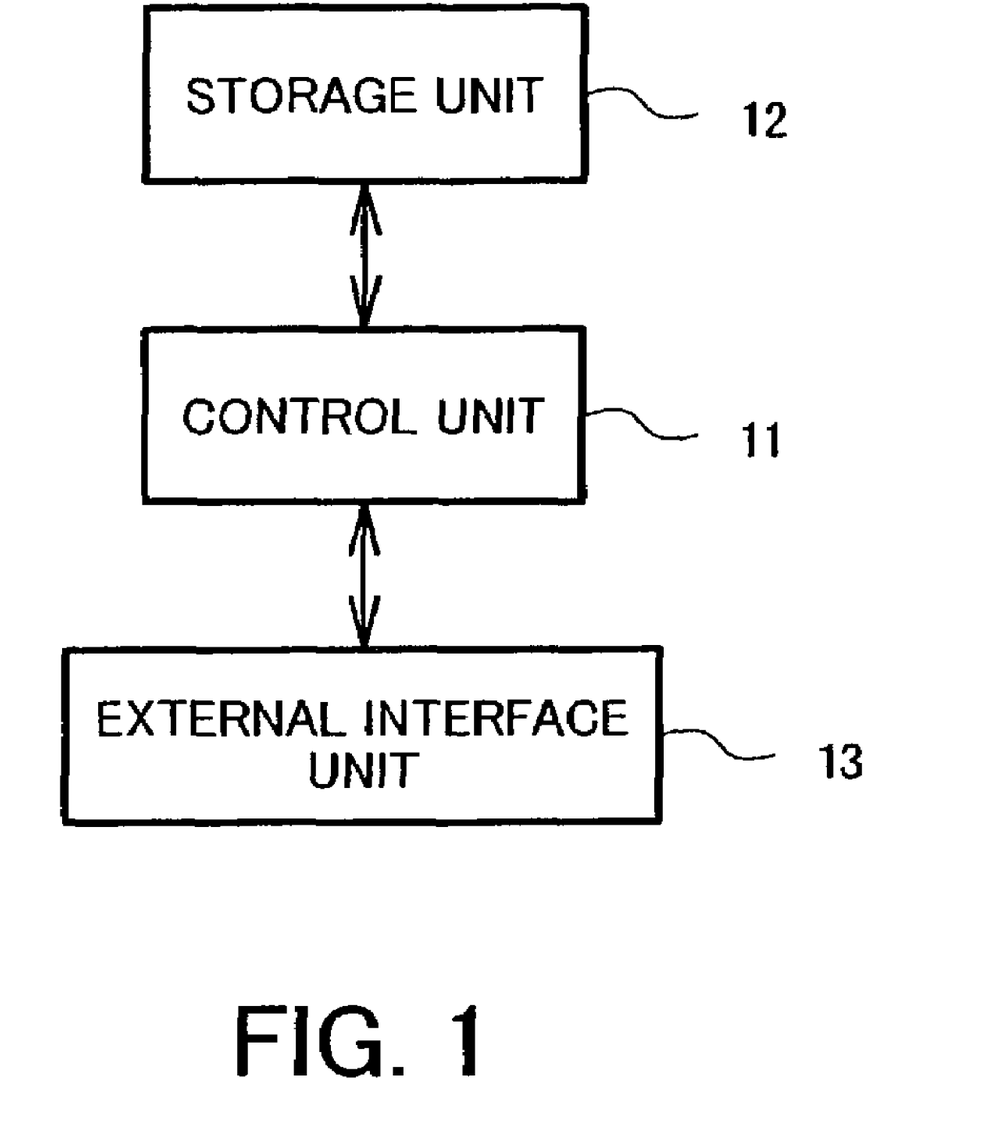
FIG. 1 is a block diagram showing a configuration of an image processing apparatus according to an embodiment of the invention.

A preferred embodiment of the invention will be described with reference to the drawings. An image coding apparatus according to the embodiment of the invention comprises a control unit 11, a storage unit 12 and an interface unit 13, as shown in FIG. 1. The control unit 11 operates according to a program stored in the storage unit 12 and codes image data to be processed input via the interface unit 13, and outputs the results via the interface unit 13. The image coding program executed by the control unit 11 will be described in detail below.

The storage unit 12 stores the program executed by the control unit 11 and also serves as a work memory for the control unit 11. The interface unit 13 transmits an externally input instruction to the control unit 11. In addition, the interface unit 13 outputs externally input image data to the control unit 11 as image data to be processed, and outputs the coded data input from the control unit 11.

Figure 2:
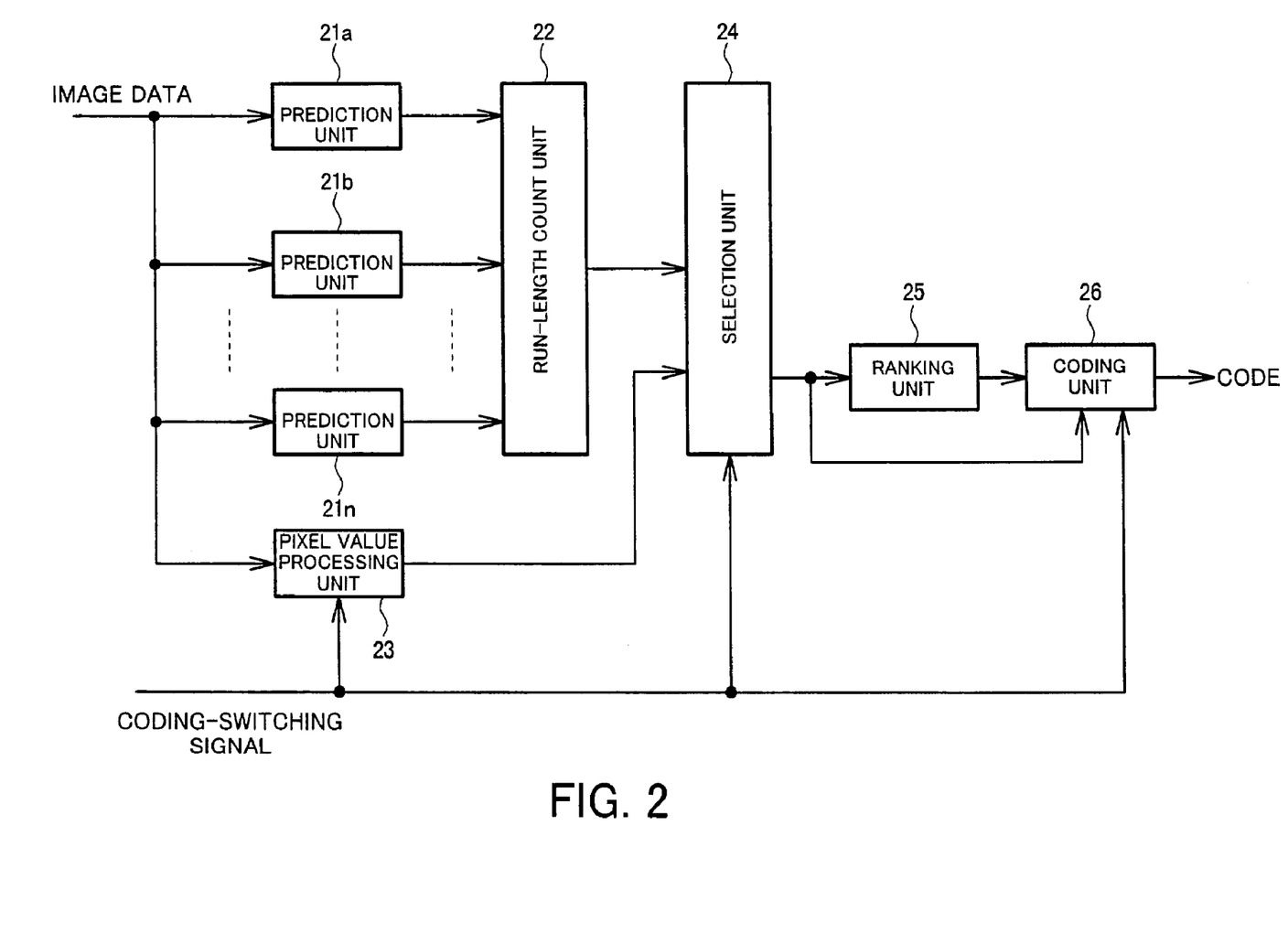
FIG. 2 is a block diagram for illustrating a function of an image processing program according to an embodiment of the invention.

Here, the image coding program executed by the control unit 11 will be described specifically. As shown in FIG. 2, the program comprises a plurality of prediction units 21a, 21b, . . . , 21n, a run-length count unit 22, a pixel value processing unit 23, a selection unit 24, an ranking unit 25 and a coding unit 26.

Pixels in image data to be processed are input to each prediction unit 21 as a data stream in a predetermined scanning order. In one scanning order, for example, pixels in rectangular image data are sequentially selected from left to right in each line.

Each prediction unit 21 has information on a positional relationship between a pixel of interest and a pixel used for prediction (predicting pixel), predicts the value of the pixel of interest based on the predicting pixel, and outputs the prediction result as a predicted pixel value. Here, the information on the positional relationship may be represented by a scan distance (that is, information indicating how many pixels are input between the predicting pixel and the current pixel of interest), for example. According to a process of generating a predicted pixel value, for example, the pixel value of the predicting pixel is used, as it is, as the predicted pixel value.

Specifically, the predicting pixel used by each prediction unit 21 may be such as that shown in FIG. 4. The prediction unit 21a adopts, as a predicting pixel, the pixel (A) located to the left of the pixel of interest (the distance information thereof being "1"), and outputs the pixel value of that pixel as the predicted pixel value. Meanwhile, the prediction pixel 21b adopts, as a predicting pixel, the pixel (B) located above the pixel of interest (the distance information thereof being "L", where character L indicating a length of one line in the image data), and outputs the pixel value of that pixel as the predicted pixel value. Similarly, the prediction unit 21c has distance information "L+1" set therein, and outputs the pixel value of the pixel (C) as the predicted pixel value. The prediction unit 21d has distance information "L−1" set therein, and outputs the pixel value of the pixel (D) as the predicted pixel value. Furthermore, another prediction unit 21 having distance information set to any of "2" to "L−2", for example, may be provided.

In this manner, the prediction unit 21 retrieves a same-pixel-value string with respect to only one partial positional relationship (for example, the pixels A to D in FIG. 4) selected from among all the possible positional relationships detected in a predetermined range of pixels (the predetermined number of pixels preceding the pixel of interest) in the image data to be processed.

The run-length count unit 22 counts, as a run-length, the number of times that the predicted pixel values output from each prediction unit 21 successively corresponds with the values of the pixels of interest sequentially scanned. In this manner, a same-pixel-value string and the length thereof (run-length) are detected. On the other hand, the pixel value processing unit 23 calculates the difference between the predicted pixel value output from the prediction unit 21a and the pixel value of the pixel of interest (value of the pixel of interest) and outputs the results.

The selection unit 24 receives, for each prediction unit 21, the run-length value output from the run-length count unit 22, which is the number of times of successive correct predictions, the difference information output from the pixel value processing unit 23 and the value of the pixel of interest. When any prediction unit 21 attains a run-length of one pixel or more, the selection unit 24 selects one of the prediction units 21 according to a predetermined condition, and outputs the information for identifying the prediction unit 21 and the run-length value for the selected prediction unit 21. The condition for selecting the prediction unit 21 and details of the processing is described below.

If no prediction unit 21 attains a run-length of one pixel or more (all the run-lengths are "0-pixel"), the selection unit 24 refers to a coding-switching signal, which is input as a parameter. If the coding-switching signal indicates that normal coding is to be performed, the selection unit 24 selects and outputs the difference information input from the pixel value processing unit 23, and if the coding-switching signal indicates that coding suitable for a general decoding is to be performed, it outputs the value of the pixel of interest.

The ranking unit 25 sets an identification code for each prediction unit 21 according to the number of times that the prediction unit 21 is selected by the selection unit 24 in the processing of the image data to be processed. Specifically, the ranking unit 25 retains a code table as shown in Table 1, and assigns codes in Table 1 to the prediction units in descending order of the number of times that they are selected. That is, the information for identifying the prediction unit 21 that is most frequently selected (prediction unit in the first place) is set to "00", and the information for identifying the prediction unit 21 that is the second-most frequently selected (prediction unit in the second place) is set to "01". Similarly, the identification information for the third prediction unit is set to "100", the identification information for the fourth prediction unit is set to "101", and so on. Information indicating an incorrect prediction is set to "111". The ranking unit 25 outputs the set information as an identification code.

TABLE 1

| Prediction ranking | Code table |
|---|---|
| First place | 00 |
| Second place | 01 |
| Third place | 100 |
| Fourth place | 101 |
| Fifth place | 110 |
| Incorrect prediction | 111 |

The coding unit 26 receives the information of the identification code from the ranking unit 25 and the information from the selection unit 24, codes these pieces of information by referring to a prescribed code table and outputs the coded information. Specifically, the coding unit 26 refers to the coding-switching signal, which is externally input as a parameter. If the coding-switching signal indicates that normal coding is to be performed, the coding unit 26 refers to the identification code input from the ranking unit 25, and if the identification code identifies any of the prediction units 21, the coding unit 26 outputs the identification code as a code. On the other hand, when the identification code indicates an incorrect prediction, the coding unit 26 refers to a prescribed code table for prediction error, and outputs a code corresponding to a prediction error input from the selection unit 24. Table 2 is an example prediction error code table.

TABLE 2

| Prediction error | Code table |
|---|---|
| 0 | 000 |
| ±1 | 001 ... |
| ±2-3 | 010 ... |
| ±4-7 | 011 ... |
| ±8-15 | 100 ... |
| ±16-31 | 101 ... |
| ±32-63 | 110 ... |
| ±64-128 | 111 ... |

In addition, when the externally input coding-switching signal indicates that coding suitable for general decoding is to be performed, when information that identifies a prediction unit 21 is input to the coding unit 26, the coding unit 26 codes the distance information set for the prediction unit 21 identified by the information and the run-length value thereof by referring to a prescribed first general code table. In the case of an incorrect prediction, the coding unit 26 codes the value of the pixel of interest input from the selection unit 24 by referring to a second general code table.

Here, the first and second general code tables may be a gzip (gnu-zip) compatible code table, for example. Specifically, the tables may be Tables 3 and 4 shown below. In these tables, the numerical values in the parentheses denote the number of overhead bits. Thus, in Table 3, for example, a distance of 769 becomes a 10-bit code beginning with "10" and additionally including 8 overhead bits.

TABLE 3

| Distance | Code table |
|---|---|
| 1 | 0 |
| 769-1024 | 10 [8] |
| 1025-1536 | 11 [9] |

TABLE 4

| literal | Code table |
|---|---|
| 0-43 | 00110000-10111111 |
| 144-255 | 110010000-1111111110 |

This embodiment is characterized in that these code tables are defined to include, as a redundant code, codes corresponding to distances other than the distances of the predicting pixels. That is, in the case where the width L of the image data to be processed is generally 770 or more pixels, when the above-described prediction units 21a to 21d are used, the possible distance information occurring as a subject to be processed is any of "1" corresponding to the prediction unit 21a, "L−1" corresponding to the prediction unit 21b, "L" and "L+1". Specifically, if the width L is equal to 1024, the distance information can only be one of "1", "1023", "1024", and "1025". However, in order to enable the codes to be decoded by a general decoding process, the code table used herein trades off coding efficiency for compatibility. Thus, it is defined to include, as a redundant part, codes for all the possible positional relationship detected in a predetermined range of 769 to 1022 and 1025 or higher, and the code is 10- or 11-bits long.

Here, a common gzip code table concerning distance is as shown in Table 5. In order to enhance the coding efficiency as far as an adequate compatibility is assured, this table is subject to a code customization for deleting an unnecessary entry (customization permitted in the gzip compression), producing the code table shown in Table 3.

TABLE 5

| distance | Code table |
|---|---|
| 1 | 00000 |
| 2 | 00001 |
| 3 | 00010 |
| 4 | 00011 |
| 5-6 | 00400 [1] |
| 7-8 | 00101 [1] |
| 9-12 | 00110 [2] |
| 13-16 | 00111 [2] |
| 17-24 | 01000 [3] |
| 25-32 | 01001 [3] |
| 33-48 | 01010 [4] |
| 49-64 | 01011 [4] |
| 65-96 | 01100 [5] |
| 97-128 | 01101 [5] |
| 129-192 | 01110 [6] |
| 193-256 | 01111 [6] |
| 257-384 | 10000 [7] |
| 385-512 | 10001 [7] |
| 513-768 | 10010 [8] |
| 769-1024 | 10011 [8] |
| 1025-1536 | 10100 [9] |
| 1537-2048 | 10101 [9] |
| 2049-3072 | 10110 [10] |

TABLE 5-continued

| distance | Code table |
|---|---|
| 3073-4096 | 10111 [10] |
| 4097-6144 | 11000 [11] |
| 6145-8192 | 11001 [11] |
| 8193-12288 | 11010 [12] |
| 12289-16384 | 11011 [12] |
| 16385-24576 | 11100 [13] |
| 24577-32768 | 11101 [13] |

Numerical value in parentheses denotes the number of overhead bits

Here, the coding unit 26 is equivalent to the coding means (and a first coding step or procedure) according to the present invention, and the coding unit 26 at the time when the coding-switching signal indicates that normal coding is to be performed is equivalent to second coding means (a second coding step or procedure) according to the invention.

Preferably, at least one of a minimum value and a maximum value of the run-length is set in the run-length count unit 22, so that the run-length value is defined based on the setting. Specifically, for example, when the externally input coding-switching signal indicates that normal coding is to be performed, the run-length count unit 22 sets the minimum value of the run-length to "1" and the maximum value thereof to "17057" based on the coding-switching signal. On the other hand, when the coding-switching signal indicates that coding suitable for general decoding is to be performed, and the general decoding is designed for the gzip compression, for example, the run-length count unit 22 sets the minimum value of the run-length to "3" and the maximum value thereof to "258". This enables enhancement of compression ratio in the gzip compatible coding. As described above, according to this embodiment, the coding process is changed according to a designation of the output code, such as the coding-switching signal.

Now, a condition in which, when one or more prediction units 21 attain a run-length of one pixel or more, the selection unit 24 selects any of the prediction units 21 will be described. As in the related art, a condition may be provided for selecting the prediction unit 21 that outputs the longest run-length.

According to another condition, if one or more prediction units 21 attain a run-length of one pixel or more, a code provided based on the distance information set for each of the prediction units 21 and the run-length for each of the prediction units 21 is used as a code to be investigated, lengths of the codes to be investigated are compared with each other, and the shortest code is selectively output. Here, the length of the code to be investigated can be calculated by referring to a table of code lengths related to the distance information and run-length, without actual coding.

The code length of the code resulting from the distance information and run-length for the prediction unit 21 that attains the longest run-length is shorter than that of another prediction unit 21 in the case of coding two lines of successive same pixels (white pixels, for example), for example. In this case, for example, the line one-line above the line including the pixel of interest has a pixel string of "white white white . . . white", and the line including the pixel of interest also has the same pixel string of "white white white . . . white". Therefore, if the width of the image data is equal to 1023 pixels, the prediction unit 21b attains the longest run-length, and the distance information thereof is "1024". Here, it is assumed that the maximum value of the run-length set in the run-length count unit 22 is "258". Then, if coding is performed with respect to the distance information and run-length for the prediction unit 21b, a code (run-length, distance information) results which is represented as:
(258, 1024) (258, 1024) (258, 1024) (250, 1024).

Because the code length for the distance information "1024" is 10-bit as shown in Table 3, the resulting code (excluding the run-length part) has a total size of 40 bits.

On the other hand, as for the prediction unit 21a (having distance information "1" and run-length of "1023"), the coding results in a code for the pixel value and a code for the distance information "1". Thus, the resulting code is represented as:
literal of white pixel (258, 1) (258, 1) (258, 1) (249, 1).

The code (excluding the run-length part) has a total size of 8 bits including 8 bits of the literal of the white pixel and four "0" bits of the codes for the distance information "1".

Because the code length for the run-length is the same for both prediction units, coding the distance information and run-length for the prediction unit 21 that attains a shorter run-length results in a code having a code length shorter than that of the code for the prediction unit 21 that attains the longest run-length, and thus results in a higher coding efficiency.

In this case also, if there is no code shorter than that of the code for the longest run-length, the code provided based on the distance information and run-length for the prediction unit 21 that attains the longest run-length is preferably output.

In addition, if the coding unit 26 generates a code designed for gzip compression, it is possible to provide image data in a so-called PNG format that essentially comprises the code generated by the coding unit 26 according to an instruction input from the outside and has a predetermined data structure having an identifier referred to as a "chunk".

While an example employing gzip compression has been described hereinbefore, another compression coding, such as LZH compression, may be used. Also in such a case, the code table is defined to include, as a redundant part, codes for the distance information other than the distance information for the prediction units 21.

An example operation of the image coding apparatus according to this embodiment will next be described using an illustrative case wherein the image coding apparatus is incorporated in an image processing apparatus, such as a copier. In response to receiving a coding-switching signal and image data to be processed via the interface unit 13, the control unit 11 starts a processing according to the image coding program shown in FIG. 2. It sequentially selects pixels in the image data to be processed as pixels of interest in a predetermined scanning order and generates predicted pixel values of the pixels of interest.

Specifically, the control unit 11 adopts, as predicting pixels, pixels which are located at distances from a pixel of interest determined based on a plurality of pieces of predetermined distance information (pixels preceding the pixel of interest by their respective determined distances from the pixel of interest) and generates the predicted pixel values based on pixel values of the predicting pixels. This operation is implemented by the action of the prediction unit 21.

The predicted pixel value maybe the pixel value of the predicting pixel or one generated in another way. The method of generation of the pixel value may be varied and set according to the input coding-switching signal input. For example, when the coding-switching signal indicates that coding suitable for a general decoding is to be performed, the value of the predicting pixel is used.

The control unit 11 counts, as a run-length for each distance information, the number of times that the pixel values of the sequentially selected pixels of interest successively correspond with their respective predicted pixel values generated based on the relationship between the pixels of interest and the predicting pixels. For example, a counter associated with information for identifying each prediction unit 21 may be installed in the storage unit 12, and the number of times that the predicted pixel values generated by the prediction unit 21 successively correspond with the pixel values of the pixels of interest may be counted as a run-length.

Then, the control unit 11 selects one of the run-lengths of one pixel or more and obtains information for identifying the prediction unit 21 related to the selected run-length. The control unit 11 refers to the coding-switching signal. If the signal indicates that normal coding is to be performed, the prediction unit 21 performs coding based on the information for identifying the selected prediction unit 21 and the run-length for the prediction unit 21, and stores the resulting code in the storage unit 12.

If the coding-switching signal indicates that coding suitable for a general decoding is to be performed, the control unit 11 refers to a prescribed code table as shown in Table 3 to generate a code based on the distance between the pixel of interest and the predicting pixel used by the selected prediction unit 21 and the run-length for the selected prediction unit 21, and stores the resulting code in the storage unit 12.

If any prediction unit 21 attains a run-length of "0" (if all the predictions are incorrect), the control unit 11 refers to the coding-switching signal. If the signal indicates that normal coding is to be performed, the control unit 11 determines a difference between the pixel values of the pixel of interest and pixel located at a distance "1" from the pixel of interest as an error, codes the error, and stores the resulting code in the storage unit 12. On the other hand, if the coding-switching signal indicates that a coding suitable for a general decoding is to be performed, the control unit 11 codes the pixel value of the pixel of interest and stores the resulting code in the storage unit 12. In this manner, because the type of coding in the event of incorrect prediction varies according to the coding-switching signal, a code designed for a general decoding can be generated as required while enhancing the coding efficiency under normal operation.

When input of the image data is completed, the control unit 11 outputs the code stored in the storage unit 12 via the interface unit 13. At this time, the control unit 11 may change the destination according to the coding-switching signal.

The image coding apparatus according to the invention may be utilized, for example, in such a manner that, if it is incorporated in an image processing apparatus, a coding-switching signal indicating that normal coding is to be performed is input to the control unit 11 to perform the normal coding, or to output a code, for example, a coding-switching signal indicating that a coding suitable for a general decoding is to be performed is input to the control unit 11, for decoding by a personal computer.

What is claimed is:
1. An image coding apparatus, comprising:
 a plurality of pixel value predicting means for sequentially selecting pixels in image data to be processed as pixels of interest in a predetermined scanning order and generating predicted pixel values of the pixels of interest, wherein each pixel value predicting means generates a predicted pixel value based on a pixel value of a predicting pixel located at a distance from the pixel of interest predetermined for each pixel value predicting means;

run-length count means for counting, as a run-length for each pixel value predicting means, the number of times that the pixel values of the sequentially selected pixels of interest successively correspond with the predicted pixel values generated by each pixel value predicting means based on a relationship between the pixels of interest and the predicting pixels;

selecting means for selecting any of pixel value predicting means related to a run-length of one pixel or more; and coding means for referring to a predetermined code table and outputting a resulting code, wherein the code table includes information with respect to a distance between the pixel of interest and the pixel predicted by the selected pixel value predicting means and the run-length of the selected pixel value predicting means, and wherein said code table further includes, as a redundant code, codes related to a distance for all other possible positional relationships detected in a predetermined range.

2. The image coding apparatus according to claim 1, wherein at least one of a minimum value and a maximum value of the run-length is set in said run-length count means, and the value of the run-length to be counted is defined based on the set value.

3. The image coding apparatus according to claim 1, wherein said selecting means compares the run-lengths for the pixel value predicting means with each other and selects pixel value predicting means that is related to a longest run-length.

4. The image coding apparatus according to claim 1, wherein said selecting means preliminarily selects a plurality of pixel value predicting means from among the pixel value predicting means related to a run-length of one pixel or more;

adopts, as a code to be investigated, each of the codes obtained based on the distances between the pixel of interest and the predicting pixel determined for each of the preliminarily selected pixel value predicting means and the run-length for each of the preliminarily selected pixel value predicting means;

and selects one of said preliminarily selected pixel value predicting means based on a predetermined condition involving a code length of each code to be investigated and the run-length for each pixel value predicting means.

5. The image coding apparatus according to claim 1, wherein said selecting means preliminarily selects a plurality of pixel value predicting means from among the pixel value predicting means related to a run-length of one pixel or more;

adopts, as a code to be investigated, each of the codes obtained based on the distances between the pixel of interest and the predicting pixel determined for each of the preliminarily selected pixel value predicting means and the run-length for each of the preliminarily selected pixel value predicting means;

and selects one of said preliminarily selected pixel value predicting means based on a predetermined condition involving a code length of each code to be investigated and the run-length for each pixel value predicting means, wherein said preliminarily selected pixel value predicting means include a pixel value predicting means related to a longest run-length, and, when there exists a code to be investigated having a code length shorter than that of a code obtained based on the distance between the pixel of interest and the predicting pixel determined for the pixel value predicting means related to the longest run-length, and the run-length, the pixel value predicting means related to the code to be investigated having a shorter code length, or the pixel value predicting means related to the longest run-length is selected.

6. The image coding apparatus according to claim 1, further comprising second coding means for outputting a code based on information for identifying the selected pixel value predicting means and the run-length counted for the selected pixel value predicting means.

7. An image coding method which uses a plurality of pixel value predicting devices for sequentially selecting pixels in image data to be processed as pixels of interest in a predetermined scanning order and generating predicted pixel values of the pixels of interest, wherein each pixel value predicting device generating a predicted pixel value is based on a pixel value of a predicting pixel located at a distance from the pixel of interest that is predetermined for each pixel value predicting device, comprising:

a step of counting, as a run-length for each pixel value predicting device, the number of times that the pixel values of the sequentially selected pixels of interest successively correspond with the predicted pixel values generated by each pixel value predicting device based on a relationship between the pixels of interest and the predicting pixels;

a step of selecting at least one pixel value predicting devices related to a run-length of one pixel or more; and a step of referring to a predetermined code table and outputting a resulting code, wherein the code table includes information with respect to a distance between the pixel of interest and the pixel predicted by the selected pixel value predicting means and the run-length of the selected pixel value predicting means, and wherein said code table further includes, as a redundant code, codes related to a distance for all other possible positional relationships detected in a predetermined range.

8. The image coding method according to claim 7, further comprising a second coding step of outputting a code based on information for identifying the selected pixel value predicting device and the run-length counted for the selected pixel value predicting device.

9. A computer readable storage medium that stores a program that embodies an image coding method which uses a plurality of pixel value predicting devices for sequentially selecting pixels in image data to be processed as pixels of interest in a predetermined scanning order and generating predicted pixel values of the pixels of interest, wherein each pixel value predicting device generating a predicted pixel value is based on a pixel value of a predicting pixel located at a distance from the pixel of interest that is predetermined for each pixel value predicting device, causing a computer to perform the steps of:

counting, as a run-length for each pixel value predicting device, the number of times that the pixel values of the sequentially selected pixels of interest successively correspond with the predicted pixel values generated by each pixel value predicting device based on a relationship between the pixels of interest and the predicting pixels;

selecting at least one pixel value predicting devices related to a run-length of one pixel or more; and referring to a predetermined code table and outputting a resulting code, wherein the code table includes information with respect to a distance between the pixel of interest and the pixel predicted by the selected pixel value predicting means and the run-length of the selected pixel value predicting means, and wherein said code table further includes, as a redundant code, codes related to a distance for all other possible positional relationships detected in a predetermined range.

10. The computer-readable storage medium according to claim 9, wherein the program causes the computer to further perform:

a second coding procedure of outputting a code based on information for identifying the selected pixel value predicting module and the run-length counted for the selected pixel value predicting module.

* * * * *